United States Patent
Hagiwara (10) Patent No.: US 10,759,469 B2
(45) Date of Patent: Sep. 1, 2020

(54) ELECTRIC DRIVE DEVICE AND ELECTRIC POWER STEERING DEVICE

(71) Applicant: HITACHI AUTOMOTIVE SYSTEMS, LTD., Hitachinaka-shi, Ibaraki (JP)

(72) Inventor: Katsumasa Hagiwara, Isesaki (JP)

(73) Assignee: HITACHI AUTOMOTIVE SYSTEMS, LTD., Hitachinaka-Shi (JP)

( * ) Notice: Subject to any disclaimer, the term of this patent is extended or adjusted under 35 U.S.C. 154(b) by 0 days.

(21) Appl. No.: 16/628,580

(22) PCT Filed: May 11, 2018

(86) PCT No.: PCT/JP2018/018241
§ 371 (c)(1),
(2) Date: Jan. 3, 2020

(87) PCT Pub. No.: WO2019/012792
PCT Pub. Date: Jan. 17, 2019

(65) Prior Publication Data
US 2020/0148252 A1     May 14, 2020

(30) Foreign Application Priority Data
Jul. 13, 2017 (JP) .................. 2017-136734

(51) Int. Cl.
*H02K 11/00* (2016.01)
*B62D 5/04* (2006.01)

(52) U.S. Cl.
CPC ......... *B62D 5/0406* (2013.01); *B62D 5/0424* (2013.01)

(58) Field of Classification Search
CPC ...... H02K 11/33; H02K 5/225; H02K 11/048; H02K 11/0094; H02K 29/06; H02K 29/08; H02K 5/08; H02K 11/05; H02K 11/38
See application file for complete search history.

(56) References Cited

U.S. PATENT DOCUMENTS 6,313,624 B1 * 11/2001 Alhorn ............... G01B 7/30
310/68 B
2003/0173839 A1 9/2003 Torii
(Continued)

FOREIGN PATENT DOCUMENTS

JP    2004-40877 A    2/2004
JP    2014-45629 A    3/2014
(Continued)

OTHER PUBLICATIONS

U.S. Appl. No. 16/620,781, filed Dec. 9, 2019, Tateyama.
(Continued)

*Primary Examiner* — Thanh Lam
(74) *Attorney, Agent, or Firm* — Foley & Lardner LLP (57) ABSTRACT

Heat releasing portions (15A, 15B) that release and transmit heat generated at at least a power conversion circuit unit (16) to a motor housing (11) are formed at an end surface wall (15) of the motor housing (11) which is an opposite side to an output shaft portion (14) of a rotation shaft (23) of the electric motor. Positioning protrusions (16P), as positioning portions whose positions are fixed by board fixing portions (26A, 26B) formed at the end surface wall (15) of the motor housing (11), are formed at a part of synthetic resin that covers the power conversion circuit unit (16). With this, positioning of the power conversion circuit unit (16) can be made using the existing board fixing portions (26A, 26B), (Continued)

and an outward appearance size can be reduced without newly adding a special positioning mechanism.

10 Claims, 8 Drawing Sheets

(56) References Cited

U.S. PATENT DOCUMENTS

| | | | | |
|---|---|---|---|---|
| 2005/0167183 A1* | 8/2005 | Tominaga | ............ | H05K 7/1432 |
| | | | | 180/444 |
| 2008/0277189 A1* | 11/2008 | Kanda | .................. | B62D 5/0409 |
| | | | | 180/443 |
| 2013/0062137 A1* | 3/2013 | Motoda | .................. | H02K 11/33 |
| | | | | 180/446 |
| 2014/0202781 A1* | 7/2014 | Soma | ..................... | H02K 11/33 |
| | | | | 180/65.1 |
| 2016/0036304 A1 | 2/2016 | Yamasaki | | |
| 2017/0353082 A1 | 12/2017 | Hamada | | |
| 2018/0248451 A1* | 8/2018 | Hagiwara | ................ | G01L 5/221 |
| 2019/0300047 A1* | 10/2019 | Hamada | ............ | H05K 7/20854 |

FOREIGN PATENT DOCUMENTS

| | | |
|---|---|---|
| JP | 2016-036246 A | 3/2016 |
| JP | 2017-216838 A1 | 12/2017 |
| WO | WO-2018/230211 A1 | 12/2018 |
| WO | WO-2019/003501 A1 | 1/2019 |
| WO | WO-2019/016999 A1 | 1/2019 |

OTHER PUBLICATIONS

U.S. Appl. No. 16/626,702, filed Dec. 26, 2019, Hara.
International Search Report issued in corresponding application No. PCT/JP2018/018241 dated Aug. 7, 2018.
Written Opinion issued in corresponding application No. PCT/JP2018/018241 dated Aug. 7, 2018.
International Preliminary Report on Patentability issued in corresponding application No. PCT/JP2018/018241 dated Jan. 23, 2020.

\* cited by examiner

ELECTRIC DRIVE DEVICE AND ELECTRIC POWER STEERING DEVICE

TECHNICAL FIELD

The present invention relates to an electric drive device and an electric power steering device, and more particularly to an electric drive device and an electric power steering device in which an electronic control device is mounted.

BACKGROUND ART

In a field of general industrial equipment, a mechanical control element is driven by an electric motor. In recent years, so-called electrically mechanically integrated electric drive device, which is configured such that an electronic control unit formed from a semiconductor element etc. controlling a rotation speed and/or a rotation torque of the electric motor is integrally mounted in the electric motor, has been used.

As an example of the electrically mechanically integrated electric drive device, for instance, an electric power steering device is configured such that a turning direction and a turning torque of a steering shaft that turns by driver's operation of a steering wheel are detected, and on the basis of these detection values, the electric motor is driven so as to rotate in the same direction as the turning direction of the steering shaft, then a steering assist torque is generated. To control this electric motor, the power steering device is provided with an electronic control unit (ECU: Electronic Control Unit).

As a related art electric power steering device, for instance, an electric power steering device disclosed in Japanese Unexamined Patent Application Publication No. 2016-036246 (Patent Document 1) is known. Patent Document 1 discloses the electric power steering device configured by an electric motor unit and an electronic control unit. An electric motor of the electric motor unit is housed in a motor housing having a cylindrical portion made of aluminum alloy etc. A board of the electronic control unit on which electronic elements or components are mounted is fixed to a heat sink that is located at an opposite side to an output shaft of the electric motor in an axial direction of the motor housing and serves as a lid of an ECU housing.

The board fixed to the heat sink mounts thereon a power supply circuit unit, a power conversion circuit unit (a power module) having a power switching element such as a MOSFET and an IGBT that drive and control the electric motor, and a control circuit unit that controls the power switching element. An output terminal of the power switching element and an input terminal of the electric motor are electrically connected through bus bars.

Power is supplied to the electronic control unit fixed to the heat sink from a power supply through a connector case made of synthetic resin. Further, detection signals concerning an operating state etc. are sent to the electronic control unit from detection sensors. The connector case functions as a lid member or a cover member, and is fixed to an outer peripheral surface of the heat sink with a fixing screw so as to hermetically seal the heat sink.

As another electric drive device in which the electronic control device is integrally mounted, an electric brake and an electric hydraulic pressure controller for various kinds of hydraulic pressure control are known. In the following description, the electric power steering device from among these electric drive devices will be explained.

CITATION LIST

Patent Document

Patent Document 1: Japanese Unexamined Patent Application Publication No. 2016-036246

SUMMARY OF THE INVENTION

Technical Problem

This kind of electric power steering device is required to be mounted in a narrow and small space in an engine room of the vehicle, and size reduction of the electric power steering device is a strong demand. Therefore, the power conversion circuit unit is placed at an end surface wall of the motor housing, and the output terminal of the power switching element and the input terminal of the electric motor are electrically connected through the bus bars. The input terminal of the electric motor is drawn out to a position close to the output terminal of the power switching element from a leading hole formed at the end surface wall.

Then, the bus bar at the output terminal side of the power conversion circuit unit and the bus bar at the input terminal side of the electric motor contact such that their top end surfaces face each other, and their top end portions are welded together by TIG (Tungsten Inert Gas) welding. Here, when performing the TIG welding, one of important welding conditions is to increase position accuracy of the welded bus bars. In order to increase the position accuracy of the welded bus bars, as a normal method, it is conceivable that a positioning mechanism for the power conversion circuit unit that is packaged with synthetic resin will be newly added, or a positioning will be made by pressing the power conversion circuit unit against a specially-provided positioning wall using a special assembly jig (a special jig mechanism).

However, as mentioned above, since the size reduction of the electric power steering device is required, if such a method that the positioning mechanism is newly added or the positioning is made by pressing the power conversion circuit unit against the positioning wall using the special jig mechanism is employed, a new positioning mechanism or a space for pressing the power conversion circuit unit against the positioning wall is needed, and this may interfere with the size reduction of the electric power steering device.

A main object of the present invention is therefore to provide a new electric drive device and a new electric power steering device that are capable of making positioning of the power conversion circuit unit using existing components without newly adding a special positioning mechanism and also capable of reducing an outward appearance size.

Solution to Problem

The present invention is characterized in that positioning portions whose positions are fixed by board fixing portions formed at an end surface wall of a motor housing are formed at a part of synthetic resin that covers a power conversion circuit unit.

Effects of Invention

According to the present invention, positioning of the positioning portions formed at the power conversion circuit unit is made using the existing board fixing portions. Therefore, since there is no need to newly add the special positioning mechanism, it is possible to reduce the outward appearance size and also increase the position accuracy of the bus bars.

EMBODIMENTS FOR CARRYING OUT THE INVENTION

An embodiment of the present invention will be explained in detail below with reference to the drawings. The present invention is not limited to the following embodiment, and includes all design modifications and equivalents belonging to the technical scope of the present invention.

Figure 1:
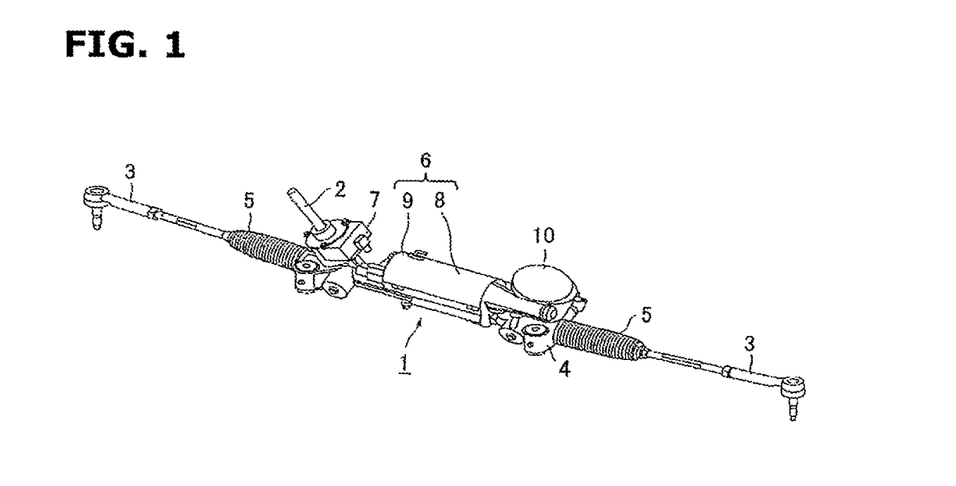
FIG. 1 is a general perspective view of a steering device as an example to which the present invention is applied.

Before explaining the embodiment of the present invention, a configuration of a steering device as an example to which the present invention is applied will be briefly explained using FIG. 1.

First, a steering device to steer front wheels of a vehicle will be explained. A steering device 1 is configured as shown in FIG. 1. A pinion (not shown) is provided at a lower end of a steering shaft 2 connecting to a steering wheel (not shown). This pinion is engaged with a rack (not shown) that extends in right and left directions of a vehicle body. A tie rod 3 to steer the front wheels in the right and left directions is each connected to both ends of the rack. The rack is accommodated in a rack housing 4. Between the rack housing 4 and each tie rod 3, a rubber boot 5 is provided.

The steering device 1 is provided with an electric power steering device 6 to assist torque when performing a turning operation of the steering wheel. That is, a torque sensor 7 that detects a turning direction and a turning torque of the steering shaft 2 is provided. And, an electric motor unit 8 that provides a steering assistive force to the rack via a gear 10 on the basis of a detection value of the torque sensor 7 is provided. Further, an electronic control unit (ECU) 9 that controls an electric motor disposed in the electric motor unit 8 is provided. The electric motor unit 8 of the electric power steering device 6 is connected to the gear 10 at three portions of an outer periphery at an output shaft side of the electric motor unit 8 with bolts (not shown). The electronic control unit 9 is disposed on an opposite side to the output shaft side of the electric motor unit 8.

In the electric power steering device 6, when the steering shaft 2 is turned in any turning direction by the steering wheel operation, the torque sensor 7 detects the turning direction and the turning torque of the steering shaft 2. A control circuit unit calculates a drive operation amount of the electric motor on the basis of these detection values. The electric motor is then driven by a power switching element of a power conversion circuit unit on the basis of the calculated drive operation amount. And, an output shaft of the electric motor rotates so as to drive and rotate the steering shaft 2 in the same direction as a direction of the steering wheel operation. This rotation of the output shaft of the electric motor is transmitted to the rack (not shown) through the pinion (not shown) and the gear 10, and the vehicle is steered. Since such configuration and workings are well known, a further explanation will be omitted here.

As mentioned above, a bus bar at an output terminal side of a power conversion circuit unit and a bus bar at an input terminal side of the electric motor contact such that their top end surfaces face each other, and their top end portions are welded together by TIG welding. When performing the TIG welding, one of important welding conditions is to increase position accuracy of the welded bus bars. In order to increase the position accuracy of the welded bus bars, as a normal method, a positioning mechanism for the power conversion circuit unit is newly added, or a positioning is made by pressing the power conversion circuit unit against a specially-provided positioning wall using a special assembly jig (a special jig mechanism).

However, since the size reduction of the electric power steering device is required, if such a method that the positioning mechanism is newly added or the positioning is made by pressing the power conversion circuit unit against the positioning wall using the special jig mechanism is employed, a new positioning mechanism or a space for pressing the power conversion circuit unit against the positioning wall is needed, and this may interfere with the size reduction of the electric power steering device.

From such background, the present embodiment proposes the electric power steering device having the following configuration. That is, in the present embodiment, heat releasing portions that release and transmit heat generated at at least a power conversion circuit unit to a motor housing are formed at an end surface wall of the motor housing which is an opposite side to an output shaft portion of a rotation shaft of the electric motor. And, positioning portions whose positions are fixed by board fixing portions formed at the end surface wall of the motor housing are formed at a part of synthetic resin that covers the power conversion circuit unit.

According to this configuration, positioning of the positioning portions formed at the power conversion circuit unit is made using the existing board fixing portions. Therefore, an outward appearance size can be reduced without newly adding a special positioning mechanism.

Figure 2:
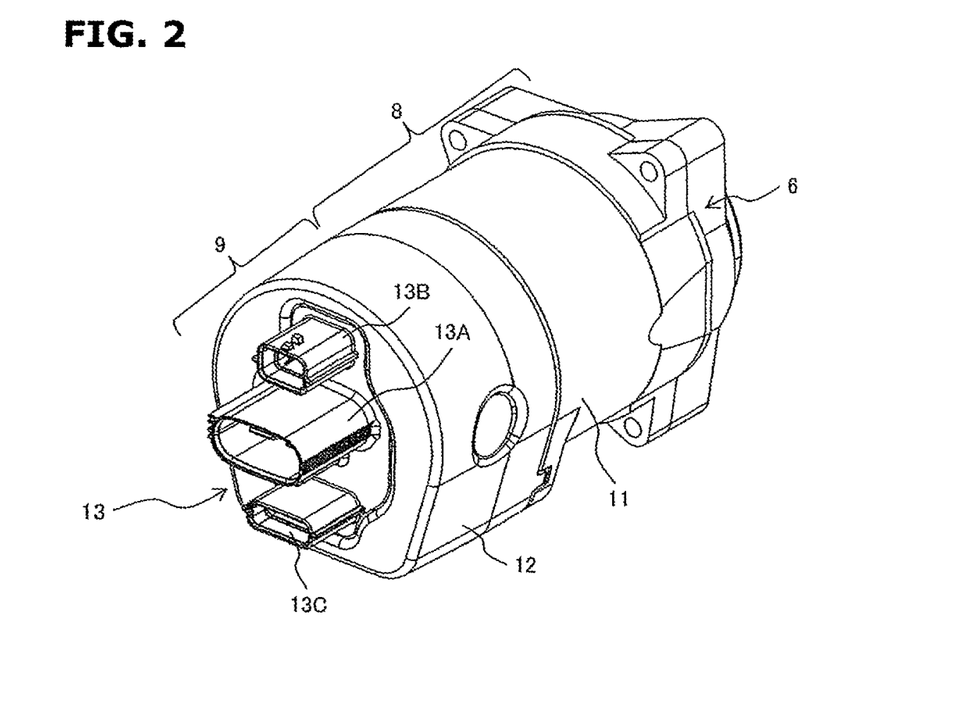
FIG. 2 is a general perspective view of an electric power steering device according to an embodiment of the present invention.
Figure 3:
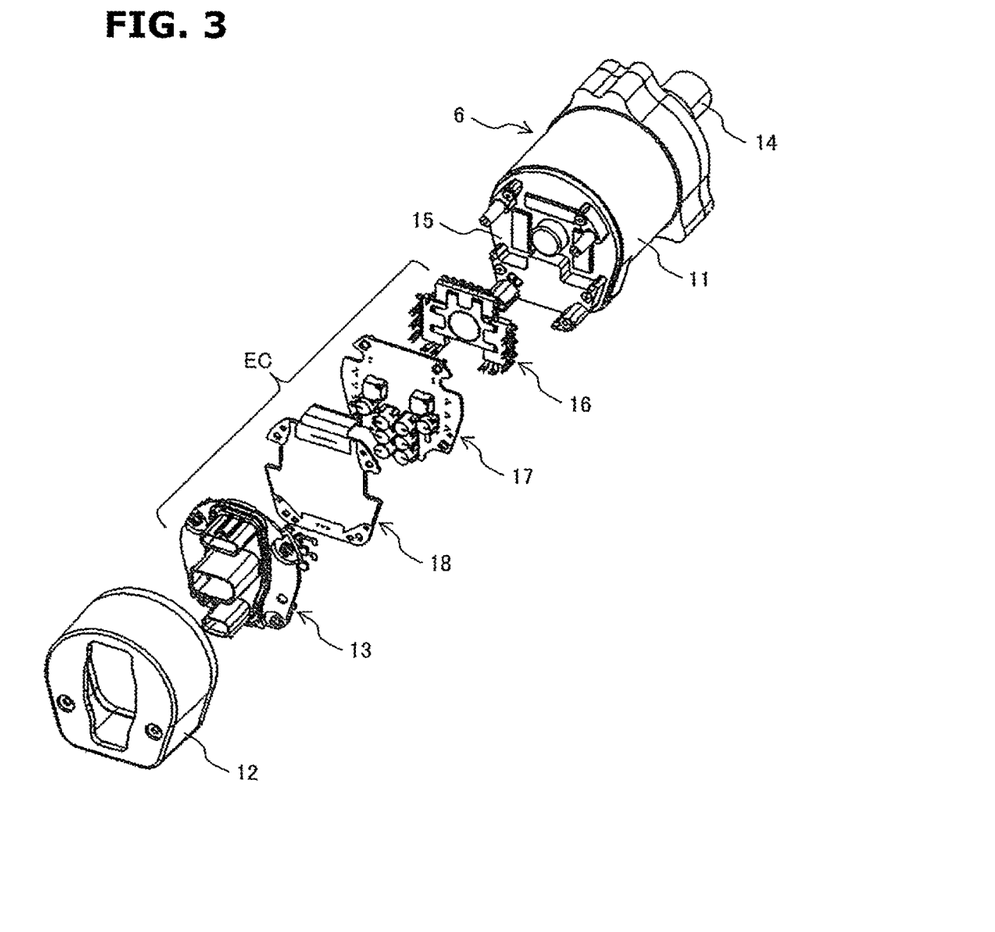
FIG. 3 is a perspective exploded view of the electric power steering device shown in FIG. 2.
Figure 10:
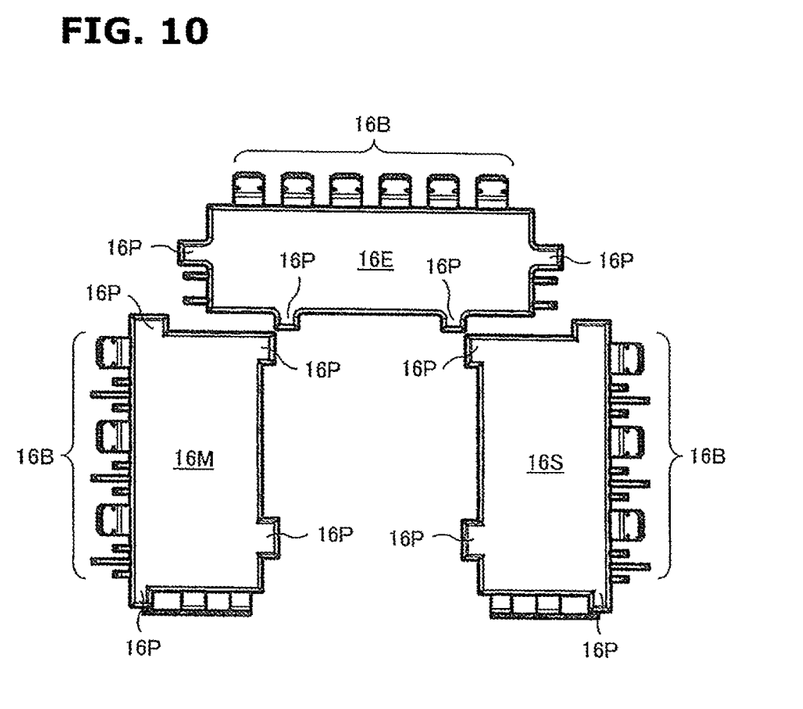
FIG. 10 is a top view of the power conversion circuit unit with only the power conversion circuit unit shown in FIG. 6 being taken out.
Figure 11:
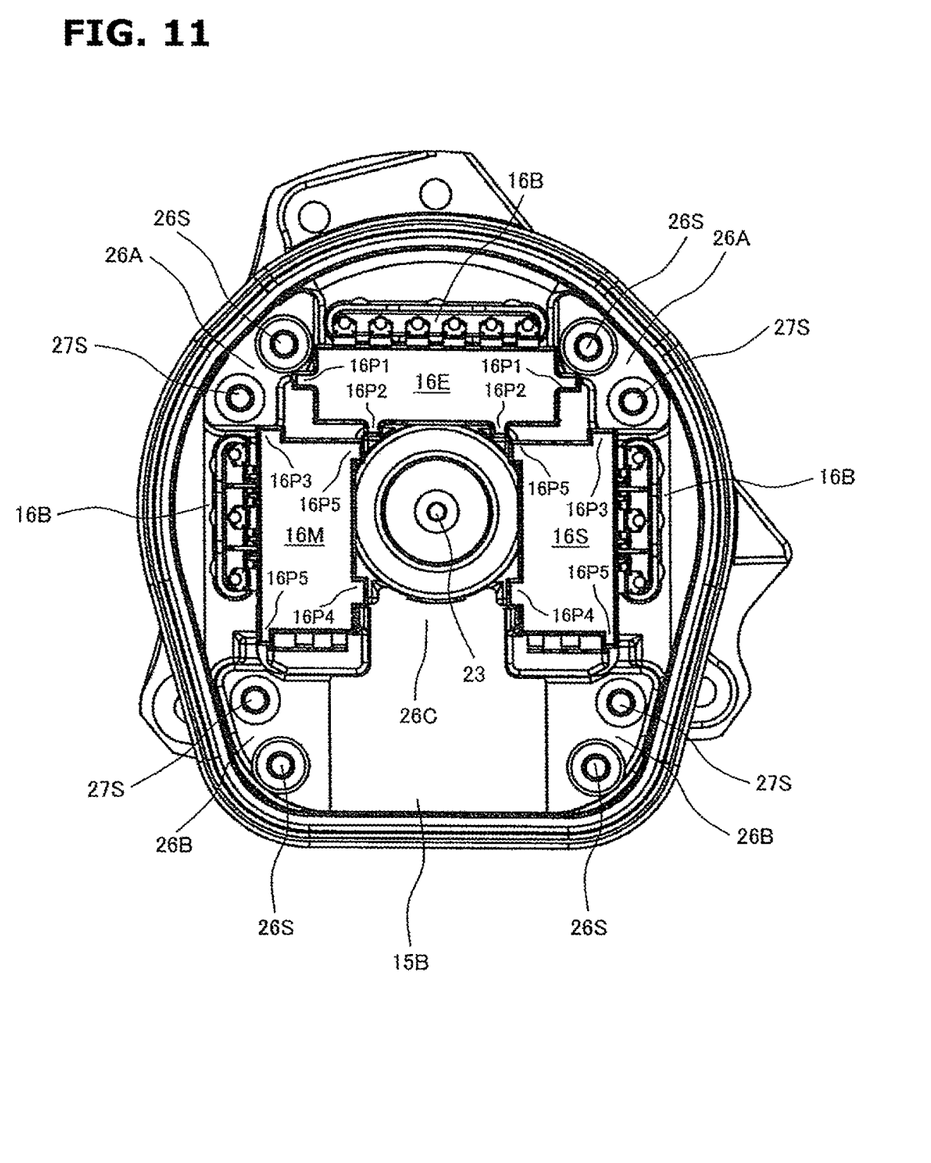
FIG. 11 is a front view of the power conversion circuit unit shown in FIG. 6, viewed from an opposite side to the motor housing, with the power conversion circuit unit being mounted.

In the following description, a configuration of the electric power steering device according to the embodiment of the present invention will be explained in detail with reference to FIGS. 2 to 11. FIG. 2 is a drawing showing a general configuration of the electric power steering device according to the present embodiment. FIG. 3 is a drawing, viewed from an oblique direction, with components of the electric power steering device shown in FIG. 2 dismantled. FIGS. 4 to 9 are drawings showing assembly states of components that are assembled in an assembly order. FIGS. 10 and 11 are drawings for explaining a positioning method of the power conversion circuit unit. The embodiment will be explained below with reference to the drawings.

As shown in FIG. 2, an electric motor unit 8 forming the electric power steering device is configured by a motor housing 11 having a cylindrical portion made of aluminum alloy etc. and an electric motor (not shown) accommodated in the motor housing 11. An electronic control unit 9 is configured by a metal cover 12 made of aluminum alloy etc. and located at an opposite side to an output shaft of the electric motor in an axial direction of the motor housing 11 and an electronic control unit (not shown) accommodated in this metal cover 12.

The motor housing 11 and the metal cover 12 are fixedly connected to each other at their opposing end surfaces with an adhesive or fixing bolts or by welding. The electronic control unit accommodated in an inside accommodation space of the metal cover 12 is configured by a power supply circuit unit that generates a required power, a power conversion circuit unit having a power switching element such as a MOSFET and an IGBT that drive and control the electric motor of the electric motor unit 8, and a control circuit unit that controls the power switching element. An output terminal of the power switching element and an input terminal of a coil of the electric motor are electrically connected through bus bars.

A connector terminal assembly 13 is fixed to an end surface of the metal cover 12 with fixing bolts. The connector terminal assembly 13 has a connector terminal forming portion 13A for power supply, a connector terminal forming portion 13B for detection sensors, and a connector terminal forming portion 13C for control state output by which a control state is outputted to an external device. The electronic control unit accommodated in the metal cover 12 is supplied with power from a power supply through the synthetic-resin-made connector terminal forming portion 13A for power supply. Further, the electronic control unit is provided with detection signals of an operating condition etc. from the detection sensors through the connector terminal forming portion 13B for detection sensors. A current control state signal of the electric power steering device is outputted from the electronic control unit through the connector terminal forming portion 13C for control state output.

FIG. 3 is a perspective exploded view of the electric power steering device 6. An iron-made annular side yoke (not shown) is fitted to an inside of a motor housing 11. The electric motor is accommodated inside this side yoke. An output shaft portion 14 of the electric motor provides the steering assistive force to the rack via the gear. Since a specific structure of the electric motor is well known, its explanation will be omitted here.

The motor housing 11 is made of aluminum alloy, and acts as a heat sink that radiates or releases heat generated at the electric motor and heat generated in after-mentioned power supply circuit unit and power conversion circuit unit to the outside atmosphere. The electric motor and the motor housing 11 form the electric motor unit 8.

The electronic control unit EC is connected to an end surface wall 15 of the motor housing 11 which is an opposite side to the output shaft portion 14 of the electric motor unit 8. The electronic control unit EC has the power conversion circuit unit 16, the power supply circuit unit 17 and the control circuit unit 18. The end surface wall 15 of the motor housing 11 is formed integrally with the motor housing 11. However, the end surface wall 15 could be formed separately from the motor housing 11, then fixed to the motor housing 11 with bolts or by welding.

Here, the power conversion circuit unit 16, the power supply circuit unit 17 and the control circuit unit 18 form a redundant system (a dual-redundancy system) by a main electronic control unit and a sub-electronic control unit. In a normal condition, the electric motor is driven and controlled by the main electronic control unit. However, if an abnormal condition or a failure occurs at the main electronic control unit, the control is switched to the sub-electronic control unit, and the electric motor is driven and controlled by the sub-electronic control unit.

Therefore, normally, heat from the main electronic control unit is transmitted to the motor housing 11. If the abnormal condition or the failure occurs at the main electronic control unit, the main electronic control unit stops and the sub-electronic control unit operates, then heat from the sub-electronic control unit is transmitted to the motor housing 11. These will be described later.

However, both of the main electronic control unit and the sub-electronic control unit could operate as a regular electronic control unit, although the present invention does not apply this configuration. And, if the abnormal condition or the failure occurs at one of the electronic control units, the other electronic control unit drives and controls the electric motor by half ability. In this case, although capability of the electric motor is half, so-called limp-home function is secured. Therefore, in the normal condition, heat from the main electronic control unit and the sub-electronic control unit is transmitted to the motor housing 11.

The electronic control unit EC is configured by the power conversion circuit unit 16, the power supply circuit unit 17, the control circuit unit 18 and the connector terminal assembly 13. These power conversion circuit unit 16, power supply circuit unit 17, control circuit unit 18 and connector terminal assembly 13 are arranged in this order from the end surface wall 15 side to a direction moving away from the end surface wall 15. The control circuit unit 18 is a unit that generates a control signal for driving the switching element of the power conversion circuit unit 16, and is configured by a microcomputer and a peripheral circuit and so on. The power supply circuit unit 17 is a unit that generates power to drive the control circuit unit 18 and power for the power conversion circuit unit 16, and is configured by a capacitor, a coil and a switching element and so on. The power conversion circuit unit 16 is a unit that controls power (current) flowing in the coil of the electric motor, and is configured by a switching element that forms three-phase upper and lower arms and so on.

A unit having a large heat value in the electronic control unit EC is mainly the power conversion circuit unit 16 and the power supply circuit unit 17. Heat of the power conversion circuit unit 16 and the power supply circuit unit 17 is released from the motor housing 11 made of aluminum alloy. In the present embodiment, a power conversion circuit unit fixing member having an elastic function member is attached to the end surface wall of the motor housing 11 at an end portion side of a rotation shaft of the electric motor. The power conversion circuit unit 16 is then pressed against and held toward heat releasing portions that are formed at the end surface of the motor housing 11 by the elastic function member provided at the power conversion circuit unit fixing member.

The synthetic-resin-made connector terminal assembly 13 is arranged between the control circuit unit 18 and the metal cover 12, and is connected to a vehicle battery (the power supply) and other external control device (not shown). Needless to say, the connector terminal assembly 13 is connected to the power conversion circuit unit 16, the power supply circuit unit 17 and the control circuit unit 18.

The metal cover 12 has a function of accommodating and liquid-tightly sealing the power conversion circuit unit 16, the power supply circuit unit 17 and the control circuit unit 18. In the present embodiment, the metal cover 12 is fixed to the motor housing 11 by welding. Since the metal cover 12 is made of metal, the metal cover 12 also has a function of radiating or releasing heat generated at the power conversion circuit unit 16 and the power supply circuit unit 17 etc. to the outside.

Figure 4:
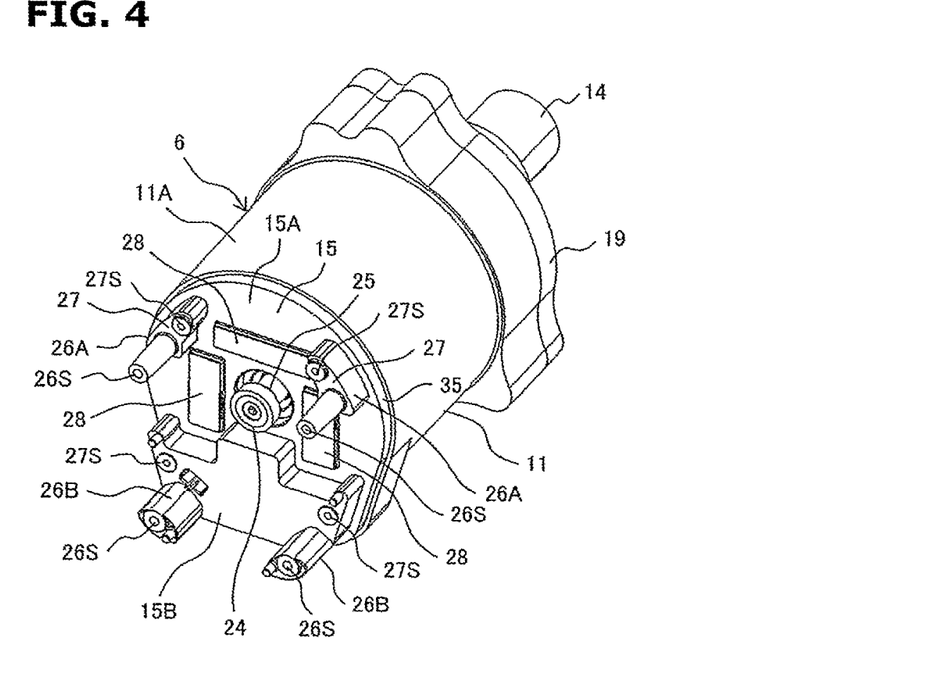
FIG. 4 is a perspective view of a motor housing shown in FIG. 3.
Figure 5:
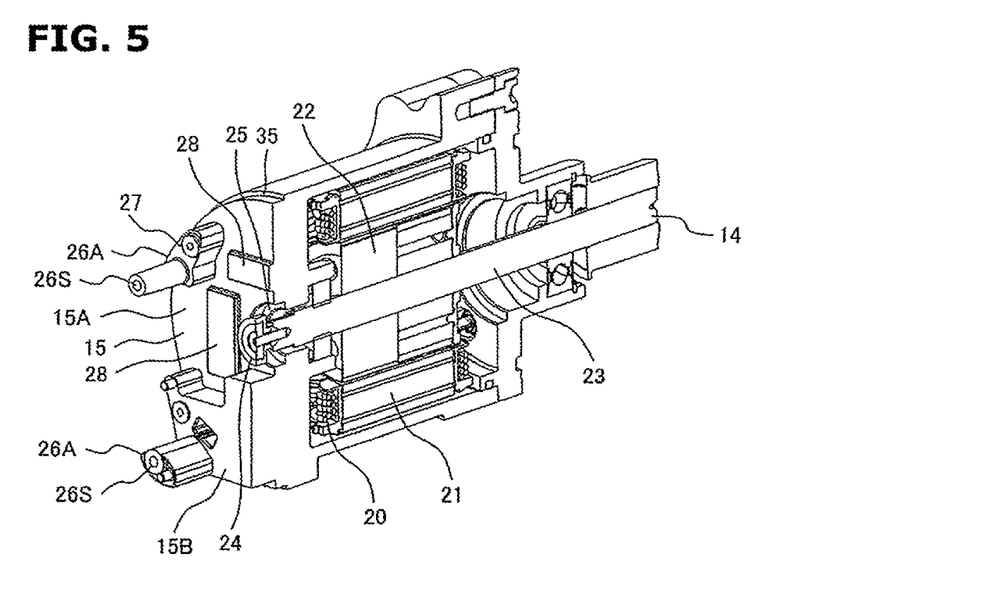
FIG. 5 is a cross section of the motor housing shown in FIG. 4, which is cut in an axial direction of the motor housing.

Next, structure or configuration of each component and an assembling method of the components will be explained with reference to FIGS. 4 to 9. FIG. 4 is an external view of the motor housing 11. FIG. 5 is a cross section of the motor housing 11, which is cut in an axial direction of the motor housing 11.

In FIGS. 4 and 5, the motor housing 11 is shaped into a cylindrical or tubular shape. The motor housing 11 has a side peripheral surface portion 11A, the end surface wall 15 that closes one end of the side peripheral surface portion 11A and an end surface wall 19 that closes the other end of the side peripheral surface portion 11A. In the present embodiment, the side peripheral surface portion 11A and the end surface wall 15 are formed integrally with each other, then the motor housing 11 has a bottomed cylindrical shape. The end surface wall 19 serves as a lid, and closes the other end of the side peripheral surface portion 11A after accommodating the electric motor in the side peripheral surface portion 11A.

As shown in FIG. 5, a stator 21 having cores around which coils 20 are wound is fitted in the side peripheral surface portion 11A, and a rotor 22 in which a permanent magnet is embedded is rotatably accommodated inside this stator 21. A rotation shaft 23 is fixed to the rotor 22, and its one end is the output shaft portion 14, and its other end is a rotation detection portion 24 for detecting a rotation phase and a rotation speed of the rotation shaft 23. The rotation detection portion 24 is provided with a permanent magnet, and protrudes to the outside through a penetration hole 25 formed at the end surface wall 15. The rotation phase and the rotation speed of the rotation shaft 23 are detected by a magnetism detecting portion configured by a GMR element (not shown) etc.

Returning to FIG. 4, heat radiating sections (heat releasing sections) 15A and 15B for the power conversion circuit unit 16 and the power supply circuit unit 17, which are features of the present embodiment, are formed on a surface of the end surface wall 15 located at an opposite side to the output shaft portion 14 of the rotation shaft 23. Further, board fixing portions 26A and 26B are formed integrally with the end surface wall 15 at four corners of the end surface wall 15 so as to stand on or protrude from the surface of the end surface wall 15. Each of the board fixing portions 26A and 26B has a screw hole 26S inside the board fixing portion. The board fixing portions 26A and 26B are provided to secure an after-mentioned board of the control circuit unit 18.

The board fixing portions 26A protruding from the power-conversion-circuit heat releasing section 15A (described later, which acts as a power-conversion-circuit mounting portion) each have a board receiving portion 27 whose height in the axial direction is the same as that of the power-supply-circuit heat releasing section 15B (described later, which acts as a power-supply-circuit mounting portion). This board receiving portion 27 is a portion on which an after-mentioned glass epoxy board 31 of the power supply circuit unit 17 is mounted. The board receiving portion 27 has a screw hole 27S to which the glass epoxy board 31 is fixed. Likewise, the power-supply-circuit heat releasing section 15B for the power supply circuit unit 17 has screw holes 27S to which the glass epoxy board 31 is fixed.

The board fixing portion 26B formed at the power-supply-circuit heat releasing section 15B is the board fixing portion 26B including the power-supply-circuit heat releasing section 15B. This is because, as described later, a part of the power-supply-circuit heat releasing section 15B is used for positioning of the power conversion circuit unit 16.

As can be seen from the drawing, a plane area forming the end surface wall 15, which is orthogonal to the rotation shaft 23, is sectioned off into two sections. One is the power-conversion-circuit heat releasing section 15A to which the power conversion circuit unit 16 is fixed, and the other is the power-supply-circuit heat releasing section 15B to which the power supply circuit unit 17 is fixed. In the present embodiment, an area of the power-conversion-circuit heat releasing section 15A is greater than that of the power-supply-circuit heat releasing section 15B. This is because the redundant system is employed as described above and a mounting area of the power conversion circuit unit 16 is secured.

And, a different height step in the axial direction (a direction in which the rotation shaft 23 extends) is provided between the power-conversion-circuit heat releasing section 15A and the power-supply-circuit heat releasing section 15B. That is, the power-supply-circuit heat releasing section 15B is formed so as to have a step that is away from the power-conversion-circuit heat releasing section 15A in the direction of the rotation shaft 23 of the electric motor. This step is set to such a height that the power conversion circuit unit 16 and the power supply circuit unit 17 do not interfere with each other when the power supply circuit unit 17 is mounted after the power conversion circuit unit 16 is mounted.

The power-conversion-circuit heat releasing section 15A is provided with three long narrow rectangular protruding heat releasing portions 28. These protruding heat releasing portions 28 are portions on which the power conversion circuit unit 16 for the redundant system is mounted. The protruding heat releasing portions 28 protrude from the surface of the power-conversion-circuit heat releasing section 15A in the direction of the rotation shaft 23 of the electric motor so as to be away from the electric motor.

The power-supply-circuit heat releasing section 15B is formed into a flat surface, and the power supply circuit unit 17 is mounted on the power-supply-circuit heat releasing section 15B. Therefore, the protruding heat releasing portion 28 acts as a heat releasing portion that releases and transmits heat generated at the power conversion circuit unit 16 to the end surface wall 15, and the power-supply-circuit heat releasing section 15B acts as a heat releasing portion that releases and transmits heat generated at the power supply circuit unit 17 to the end surface wall 15. The protruding heat releasing portions 28 might be removed. In this case, the power-conversion-circuit heat releasing section 15A acts as the heat releasing portion that releases and transmits heat generated at the power conversion circuit unit 16 to the end surface wall 15.

As described above, in the present embodiment, a separately-formed heat sink member is not needed, then a length in the axial direction can be shortened. Further, since the motor housing 11 has a sufficient heat capacity, it is possible to efficiently radiate or release heat of the power supply circuit unit 17 and the power conversion circuit unit 16 to the outside from the motor housing 11.

Figure 6:
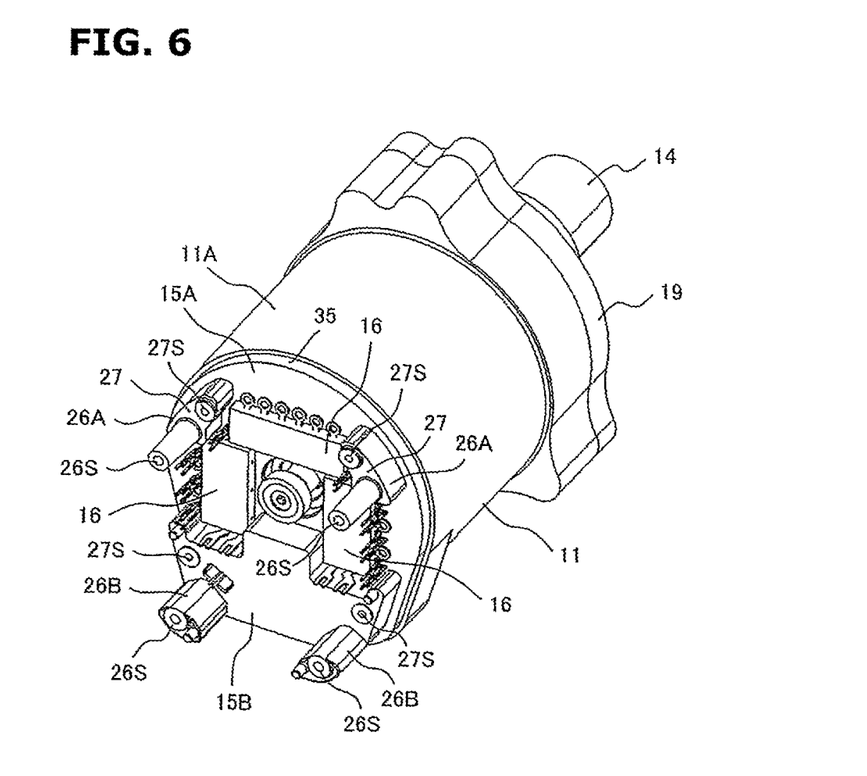
FIG. 6 is a perspective view of the motor housing shown in FIG. 4 with a power conversion circuit unit mounted on the motor housing.

Next, FIG. 6 shows a state in which the power conversion circuit unit 16 is mounted on the protruding heat releasing portions 28. As shown in FIG. 6, the power conversion circuit unit 16 forming the redundant system is mounted on the protruding heat releasing portions 28 formed on the power-conversion-circuit heat releasing section 15A. The switching element forming the power conversion circuit unit 16 is mounted on a metal board (using an aluminum-based metal), which is a good heat radiation configuration. The switching element including the metal board at the switching element side is covered and packaged with synthetic resin. Here, instead of the metal board, a resin board can be used.

Thus, the metal board of the power conversion circuit unit 16 is thermally connected to the protruding heat releasing portion 28. With this configuration, heat generated at the switching element can be efficiently transmitted to the protruding heat releasing portion 28. A heat transfer grease (or a thermal conductive grease) is applied between the metal board of the power conversion circuit unit 16 and the protruding heat releasing portion 28, which facilitates heat transmission from the power conversion circuit unit 16 to the protruding heat releasing portion 28. Further, as shown in FIG. 3, the power conversion circuit unit 16 is pressed against and held toward the protruding heat releasing portions 28 by the elastic function member of the power conversion circuit unit fixing member attached to the end portion of the rotation shaft 23 of the electric motor.

Heat transmitted to the protruding heat releasing portion 28 diffuses through the power-conversion-circuit heat releasing section 15A, and is further transmitted to the side peripheral surface portion 11A of the motor housing 11, then is released to the outside. Here, as mentioned above, since a height of the power-conversion-circuit heat releasing section 15A in the axial direction is lower than that of the power-supply-circuit heat releasing section 15B, the power conversion circuit unit 16 does not interfere with the power supply circuit unit 17.

Figure 7:
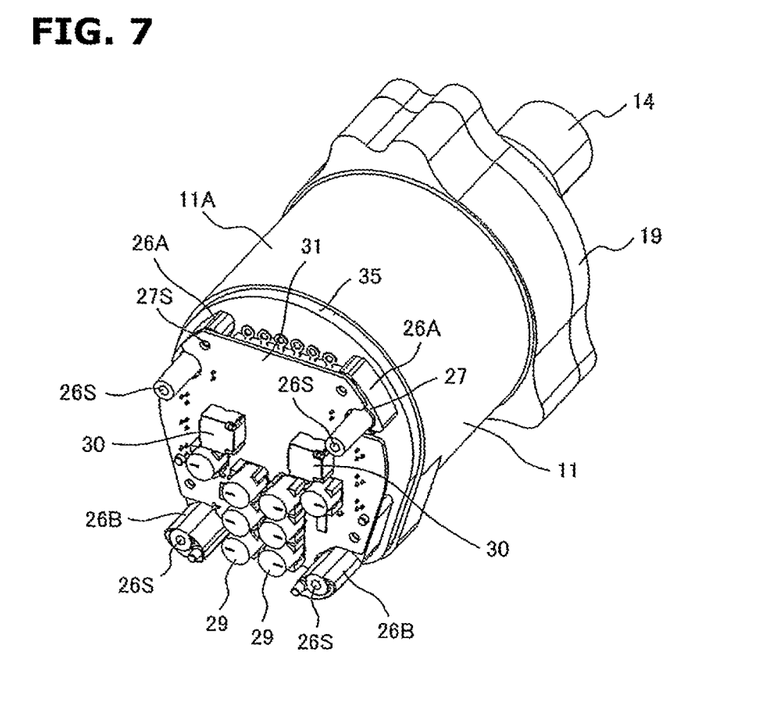
FIG. 7 is a perspective view of the motor housing shown in FIG. 4 with a power supply circuit unit further mounted on the motor housing.

Next, FIG. 7 shows a state in which the power supply circuit unit 17 is mounted above or over the power conversion circuit unit 16. As shown in FIG. 7, the power supply circuit unit 17 is mounted on the power-supply-circuit heat releasing section 15B. Capacitors 29 and coils 30 and so on which form the power supply circuit unit 17 are mounted on the glass epoxy board 31. The power supply circuit unit 17 has the redundant system, and as can be seen from the drawings, power supply circuits configured by the capacitors 29 and the coils 30 etc., which are arranged symmetrically with respect to each other, are provided.

A surface at the power-supply-circuit heat releasing section 15B side of this glass epoxy board 31 is fixed to the end surface wall 15 so as to contact the power-supply-circuit heat releasing section 15B. As a fixing manner, as shown in FIG. 7, the glass epoxy board 31 is fixed to the screw holes 27S provided at the board receiving portions 27 of the board fixing portions 26A with fixing bolts (not shown), and also fixed to the screw holes 27S provided at the power-supply-circuit heat releasing section 15B (=the board fixing portions 26B) with fixing bolts (not shown).

Here, since the power supply circuit unit 17 is formed by the glass epoxy board 31, the circuit units could be mounted on both sides of the glass epoxy board 31. On the surface at the power-supply-circuit heat releasing section 15B side of the glass epoxy board 31, the GMR element (not shown) or a rotation phase and rotation speed detection unit that is configured by a detection circuit formed by the GMR element is mounted, and detects the rotation phase and the rotation speed of the rotation shaft 23 in cooperation with the rotation detection portion 24 provided at the rotation shaft 23.

As described above, since the glass epoxy board 31 is fixed to the end surface wall 15 so as to contact the power-supply-circuit heat releasing section 15B, it is possible to efficiently transmit heat generated at the power supply circuit unit 17 to the power-supply-circuit heat releasing section 15B. Heat transmitted to the power-supply-circuit heat releasing section 15B is further transmitted to and diffuses through the side peripheral surface portion 11A of the motor housing 11, then is released to the outside. Here, by interposing one of a good heat transfer adhesive (or a good thermal conductive adhesive), a heat transfer grease (or a thermal conductive grease) and a heat transfer sheet (or a thermal conductive sheet) between the glass epoxy board 31 and the power-supply-circuit heat releasing section 15B, a heat transfer performance (or a thermal conductivity) can be further improved.

Figure 8:
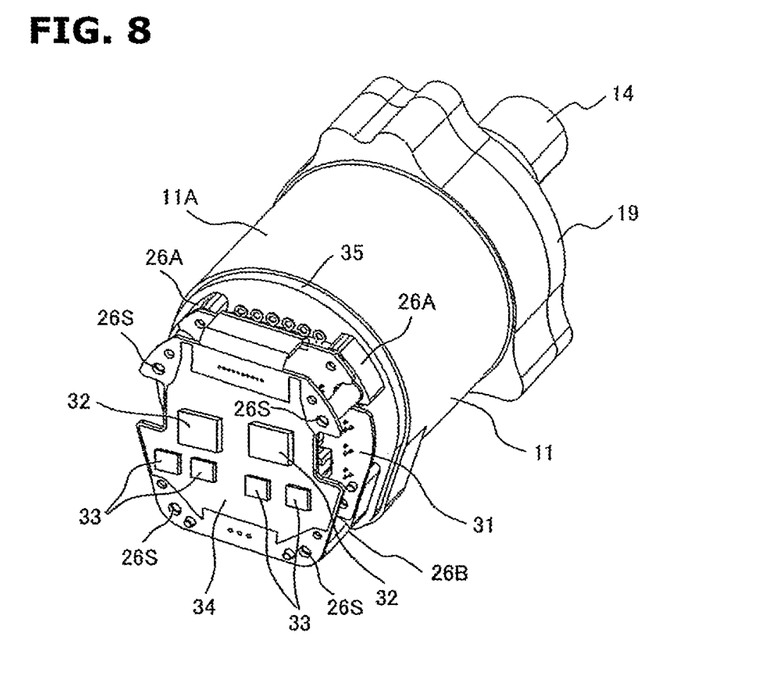
FIG. 8 is a perspective view of the motor housing shown in FIG. 4 with a control circuit unit further mounted on the motor housing.

Next, FIG. 8 shows a state in which the control circuit unit 18 is mounted above or over the power supply circuit unit 17. As shown in FIG. 8, the control circuit unit 18 is mounted above or over the power supply circuit unit 17. Microcomputers 32 and peripheral circuits 33 which form the control circuit unit 18 are mounted on the glass epoxy board 34. The control circuit unit 18 also has the redundant system, and as can be seen from the drawings, control circuits configured by the microcomputers 32 and the peripheral circuits 33, which are arranged symmetrically with respect to each other, are provided. The microcomputers 32 and the peripheral circuits 33 could be mounted on a surface at the power supply circuit unit 17 side of the glass epoxy board 34.

This glass epoxy board 34 is fixed to the bolt holes 26S provided at tops of the board fixing portions 26A and 26B with fixing bolts (not shown), as shown in FIG. 8, then a space in which the capacitors 29 and the coils 30 etc. of the power supply circuit unit 17 shown in FIG. 7 are arranged is provided between the glass epoxy board 31 of the power supply circuit unit 17 and the glass epoxy board 34 of the control circuit unit 18.

Figure 9:
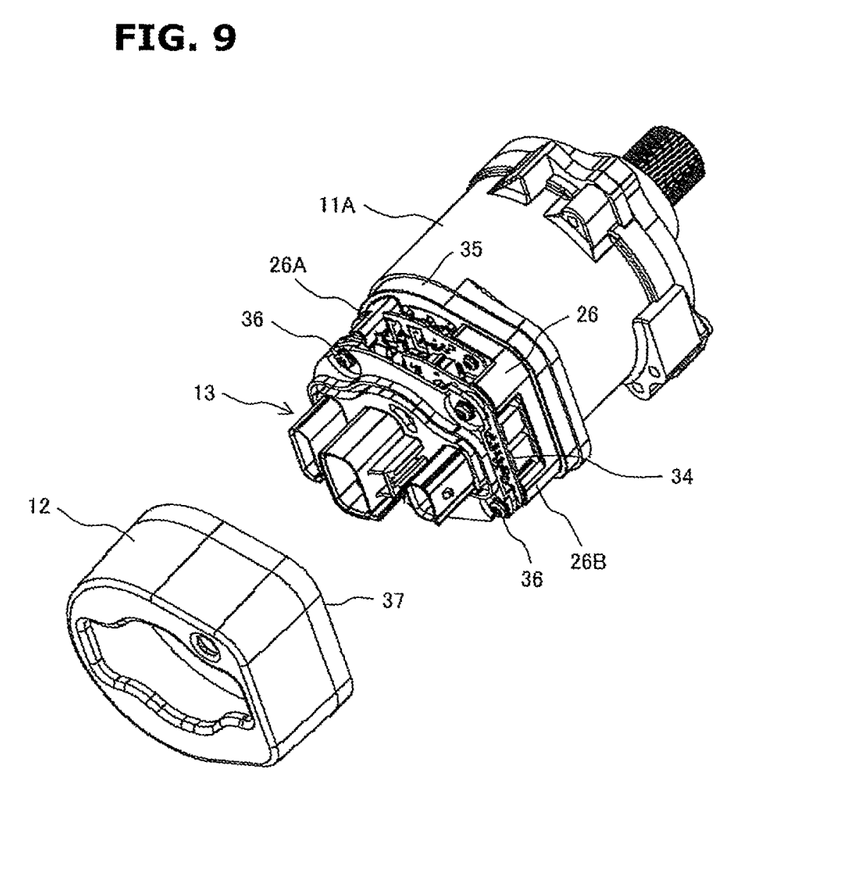
FIG. 9 is a perspective view of the motor housing shown in FIG. 4 and a metal cover that is going to be fixed to the motor housing.

Next, FIG. 9 shows a state in which the connector terminal assembly 13 is mounted above or over the control circuit unit 18. As shown in FIG. 9, the connector terminal assembly 13 is mounted above or over the control circuit unit 18. The connector terminal assembly 13 is fixed to the screw holes 26S provided at the tops of the board fixing portions 26A and 26B with fixing screws 36 so as to sandwich the control circuit unit 18 between the power supply circuit unit 17 and the connector terminal assembly 13. In this state, as shown in FIG. 3, the connector terminal assembly 13 is connected to the power conversion circuit unit 16, the power supply circuit unit 17 and the control circuit unit 18. Further, after fixing the connector terminal assembly 13, an opening end 37 of the metal cover 12 is connected to a stepped portion 35 of the motor housing 11, and fixed to the motor housing 11 by welding.

Next, a positioning structure of the power conversion circuit unit 16 will be explained with reference to FIGS. 10 and 11. In the present embodiment, as mentioned above, the power switching element is packaged with synthetic resin. And, when performing this packaging, the positioning protrusions (explained later) are formed at the same time. Here, the packaged power conversion circuit unit 16 has a substantially rectangular shape.

FIG. 10 is a top view, viewed from above, of the power conversion circuit unit 16. As described above, since the redundant system is employed in the electric power steering device of the present embodiment, the power conversion circuit unit 16 has the redundant system. Further, the power conversion circuit unit 16 has an abnormality response circuit unit to stop an operation of the power conversion circuit unit 16 upon occurrence of the failure or the abnormal condition. In FIG. 10, the power conversion circuit unit 16 is configured by a main power conversion circuit unit 16M, a sub-power conversion circuit unit 16S and an abnormality response circuit unit 16E.

As can be seen from FIG. 11, these main power conversion circuit unit 16M, sub-power conversion circuit unit 16S and abnormality response circuit unit 16E are arranged in three directions so as to enclose the rotation shaft 23. That is, the main power conversion circuit unit 16M and the sub-power conversion circuit unit 16S are arranged at facing positions (opposing positions) so as to sandwich the rotation shaft 23 (so as to be positioned at opposite sides of the rotation shaft 23), and the abnormality response circuit unit 16E is arranged between the main power conversion circuit unit 16M and the sub-power conversion circuit unit 16S. However, in the present embodiment, all of these main power conversion circuit unit 16M, sub-power conversion circuit unit 16S and abnormality response circuit unit 16E could not necessarily be provided, but at least one power conversion circuit unit 16 could be provided.

Each of the main power conversion circuit unit 16M, the sub-power conversion circuit unit 16S and the abnormality response circuit unit 16E has positioning protrusions 16P as positioning portions made with synthetic resin. These positioning protrusions 16P are formed at positions corresponding to forming positions of the four board fixing portions 26A and 26B formed at the end surface wall 15 of the motor housing 11. Therefore, forming position of the positioning protrusion 16P is different depending on the arrangement positions of the board fixing portions 26A and 26B.

At an outer side of each of the main power conversion circuit unit 16M, the sub-power conversion circuit unit 16S and the abnormality response circuit unit 16E, a bus bar 16B that is connected to the output terminal of the power switching element is drawn out. At the other three sides of each of the main power conversion circuit unit 16M, the sub-power conversion circuit unit 16S and the abnormality response circuit unit 16E, the positioning protrusions 16P are provided. The bus bars 16B are welded to respective bus bars (not shown) that are connected to the input terminal of the electric motor by TIG welding.

Here, in order to maintain a position relationship between the synthetic resin for the package and the bus bar 16B, a positioning terminal that is formed integrally with the bus bar 16B through the board (the metal board or the resin board) is formed at at least one positioning protrusion 16P of each of the main power conversion circuit unit 16M, the sub-power conversion circuit unit 16S and the abnormality response circuit unit 16E. This positioning terminal is molded to the packaged synthetic-resin-made positioning protrusion 16P, and maintains a position relationship between the positioning protrusion 16P and the bus bar 16B. With this structure, an effect of increasing the position accuracy is obtained.

The main power conversion circuit unit 16M, the sub-power conversion circuit unit 16S and the abnormality response circuit unit 16E each having such positioning protrusions 16P are arranged at the end surface wall 15 of the motor housing 11, as shown in FIG. 11.

FIG. 11 shows the main power conversion circuit unit 16M, the sub-power conversion circuit unit 16S and the abnormality response circuit unit 16E arranged at the end surface wall 15 of the motor housing 11.

As mentioned above, the power-conversion-circuit heat releasing section 15A is formed at the end surface wall 15 of the motor housing 11, and the board fixing portions 26A are formed at the end surface wall 15 so as to stand on or protrude from the surface of the end surface wall 15 in the axial direction. Further, the power-supply-circuit heat releasing section 15B with the step is formed at the end surface wall 15 of the motor housing 11 with the power-supply-circuit heat releasing section 15B being adjacent to the power-conversion-circuit heat releasing section 15A. The power-supply-circuit heat releasing section 15B forms the board fixing portions 26B, and a part of the power-supply-circuit heat releasing section 15B is used for positioning of the power conversion circuit unit 16.

As can be seen from FIG. 11, the abnormality response circuit unit 16E is located between the two board fixing portions 26A provided at the power-conversion-circuit heat releasing section 15A. Positions of the positioning protrusions 16P1 of the abnormality response circuit unit 16E, which are provided at two sides orthogonal to a longitudinal direction of the abnormality response circuit unit 16E, are fixed by and at respective wall surfaces of the two board fixing portions 26A. Then, in this state, the abnormality response circuit unit 16E is fixed to the protruding heat releasing portion 28. It is noted that in this state, the positioning protrusions 16P2 do not contribute to the positioning. Moreover, the bus bar 16B is located at the side of the abnormality response circuit unit 16E which is an opposite side to the rotation shaft 23. Then, in this state, the bus bar 16B is electrically connected to the bus bar of the electric motor by TIG welding.

Likewise, the main power conversion circuit unit 16M and the sub-power conversion circuit unit 16S are located between the two board fixing portions 26A provided at the power-conversion-circuit heat releasing section 15A and the two board fixing portions 26B that are also the power-supply-circuit heat releasing section 15B. Further, a protruding portion 26C that extends toward the rotation shaft 23 is formed at the middle of the power-supply-circuit heat releasing section 15B. The protruding portion 26C is shaped such that positioning of each of the main power conversion circuit unit 16M and the sub-power conversion circuit unit 16S can be made. This protruding portion 26C also has a function of radiating or releasing heat from the power supply circuit unit 17 more.

Positions of the positioning protrusions 16P3 of the main power conversion circuit unit 16M and the sub-power conversion circuit unit 16S, which are provided at each one of two sides orthogonal to longitudinal directions of the main power conversion circuit unit 16M and the sub-power conversion circuit unit 16S, are fixed by and at respective wall surfaces of the two board fixing portions 26A. Further, positions of the positioning protrusions 16P4, which are provided at the respective longitudinal direction sides, are fixed by and at respective wall surfaces of the protruding portion 26C protruding from the middle of the power-supply-circuit heat releasing section 15B toward the rotation shaft 23. It is noted that in this state, the positioning protrusions 16P5 do not contribute to the positioning. Moreover, the bus bars 16B are located at the sides of the main power conversion circuit unit 16M and the sub-power conversion circuit unit 16S which are opposite sides to the rotation shaft 23. Then, in this state, the bus bars 16B are electrically connected to the bus bars of the electric motor by TIG welding.

As described above, according to the present embodiment, since the existing board fixing portions 26A and 26B are used for the positioning, there is no need to change a size of the end surface wall 15 of the motor housing 11. It is thus possible to reduce the outward appearance size. Further, since the positioning protrusions 16P whose positions are fixed by the wall surfaces of the board fixing portions 26A and 26B are formed at at least two sides of each of the main power conversion circuit unit 16M, the sub-power conversion circuit unit 16S and the abnormality response circuit unit 16E, position accuracy of the welded bus bars can be increased, and good welding can be performed.

Furthermore, since the existing board fixing portions 26A and 26B are used for the positioning, there is no need to newly form another positioning portion, and a good flow of molten metal when molding the motor housing can be ensured. In addition, since the positioning terminal formed integrally with the bus bar 16B is molded to the packaged synthetic-resin-made positioning protrusion 16P, position accuracy between the positioning protrusion 16P and the bus bar 16B can be increased.

As described above, according to the present invention, the heat releasing portions that release and transmit heat generated at at least the power conversion circuit unit to the motor housing are formed at the end surface wall of the motor housing which is an opposite side to the output shaft portion of the rotation shaft of the electric motor. And, the positioning portions whose positions are fixed by the board fixing portions formed at the end surface wall of the motor housing are formed at a part of synthetic resin that covers the power conversion circuit unit. According to this configuration, positioning of the positioning portions formed at the power conversion circuit unit is made using the existing board fixing portions. Therefore, an outward appearance size can be reduced without newly adding a special positioning mechanism.

The present invention is not limited to the above embodiment, and includes all design modifications. The above embodiment is an embodiment that is explained in detail to easily understand the present invention, and the present invention is not necessarily limited to the embodiment having all elements or components described above. Further, a part of the configuration of the embodiment can be replaced with a configuration of other embodiments. Also, the configuration of other embodiments could be added to the configuration of the embodiment. Moreover, regarding a part of the configuration of the embodiment, the configuration of other embodiments could be added, removed and replaced.

As the electric drive device based on the above embodiment, for instance, the followings are raised.

That is, as one aspect of the present invention, an electric drive device comprises: a motor housing accommodating therein an electric motor that drives a mechanical control element; and an electronic control unit provided at an end surface wall side of the motor housing which is an opposite side to an output shaft portion of a rotation shaft of the electric motor and having a control circuit unit, a power supply circuit unit and a power conversion circuit unit that are configured to drive the electric motor. And, a power-conversion-circuit mounting portion on which the power conversion circuit unit covered with synthetic resin is mounted, and a power-supply-circuit mounting portion on which the power supply circuit unit mounted on a board is mounted, are formed at the end surface wall of the motor housing, the board of the power supply circuit unit is fixed to board fixing portions that are formed at the end surface wall of the motor housing, and positioning portions whose positions are fixed by the board fixing portions formed at the end surface wall of the motor housing are formed at a part of the synthetic resin covering the power conversion circuit unit.

As a preferable aspect of the electric drive device, the power-supply-circuit mounting portion formed at the end surface wall of the motor housing has a step that is away from the power-conversion-circuit mounting portion in a direction of the rotation shaft of the electric motor and forms the board fixing portions, and two board fixing portions are separately formed at a predetermined distance apart from each other at the power-conversion-circuit mounting portion, and positions of the positioning portions of the power conversion circuit unit are fixed by wall surfaces of the respective board fixing portions.

As another preferable aspect of the electric drive device, the power conversion circuit unit is configured by a main power conversion circuit unit, a sub-power conversion circuit unit and an abnormality response circuit unit, each of which has the positioning portions, the main power conversion circuit unit and the sub-power conversion circuit unit are arranged at facing positions on opposite sides of the rotation shaft of the electric motor, and the abnormality response circuit unit is arranged between the main power conversion circuit unit and the sub-power conversion circuit unit, positions of the positioning portions formed at the abnormality response circuit unit are fixed by the two board fixing portions formed at the power-conversion-circuit mounting portion, and positions of the positioning portions formed at the main power conversion circuit unit and the sub-power conversion circuit unit are fixed by the two board fixing portions formed at the power-conversion-circuit mounting portion and the board fixing portions formed by the step of the power-supply-circuit mounting portion.

As a preferable aspect of the electric drive device, the board fixing portions formed by the step of the power-supply-circuit mounting portion are formed by a protruding portion that is formed at the power-supply-circuit mounting portion so as to extend toward the rotation shaft of the electric motor.

As another preferable aspect of the electric drive device, a positioning terminal that is formed, through a board, integrally with a bus bar that is connected to an output terminal of the power conversion circuit unit is molded to the positioning portion of the power conversion circuit unit with the synthetic resin.

As the electric power steering device based on the above embodiment, for instance, the followings are raised.

That is, as one aspect of the present invention, an electric power steering device comprises: an electric motor providing a steering assistive force to a steering shaft on the basis of an output from a torque sensor that detects a turning direction and a turning torque of the steering shaft; an motor housing accommodating therein the electric motor; and an electronic control unit provided at an end surface wall side of the motor housing which is an opposite side to an output shaft portion of a rotation shaft of the electric motor and having a control circuit unit, a power supply circuit unit and a power conversion circuit unit that are configured to drive the electric motor. And, a power-conversion-circuit mounting portion on which the power conversion circuit unit covered with synthetic resin is mounted, and a power-supply-circuit mounting portion on which the power supply circuit unit mounted on a board is mounted, are formed at the end surface wall of the motor housing, the board of the power supply circuit unit is fixed to board fixing portions that are formed at the end surface wall of the motor housing, and positioning portions whose positions are fixed by the board fixing portions formed at the end surface wall of the motor housing are formed at a part of the synthetic resin covering the power conversion circuit unit.

As another preferable aspect of the electric power steering device, the power-supply-circuit mounting portion formed at the end surface wall of the motor housing has a step that is away from the power-conversion-circuit mounting portion in a direction of the rotation shaft of the electric motor and forms the board fixing portions, and two board fixing portions are separately formed at a predetermined distance apart from each other at the power-conversion-circuit mounting portion, and positions of the positioning portions of the power conversion circuit unit are fixed by wall surfaces of the respective board fixing portions.

As another preferable aspect of the electric power steering device, the power conversion circuit unit is configured by a main power conversion circuit unit, a sub-power conversion circuit unit and an abnormality response circuit unit, each of which has the positioning portions, the main power conversion circuit unit and the sub-power conversion circuit unit are arranged at facing positions on opposite sides of the rotation shaft of the electric motor, and the abnormality response circuit unit is arranged between the main power conversion circuit unit and the sub-power conversion circuit unit, positions of the positioning portions formed at the abnormality response circuit unit are fixed by the two board fixing portions formed at the power-conversion-circuit mounting portion, and positions of the positioning portions formed at the main power conversion circuit unit and the sub-power conversion circuit unit are fixed by the two board fixing portions formed at the power-conversion-circuit mounting portion and the board fixing portions formed by the step of the power-supply-circuit mounting portion.

As another preferable aspect of the electric power steering device, the board fixing portions formed by the step of the power-supply-circuit mounting portion are formed by a protruding portion that is formed at the power-supply-circuit mounting portion so as to extend toward the rotation shaft of the electric motor.

As another preferable aspect of the electric power steering device, a positioning terminal that is formed, through a board, integrally with a bus bar that is connected to an output terminal of the power conversion circuit unit is molded to the positioning portion of the power conversion circuit unit with the synthetic resin.

The invention claimed is:

1. An electric drive device comprising:
   a motor housing accommodating therein an electric motor that drives a mechanical control element; and
   an electronic control unit provided at an end surface wall side of the motor housing which is an opposite side to an output shaft portion of a rotation shaft of the electric motor and having a control circuit unit, a power supply circuit unit and a power conversion circuit unit that are configured to drive the electric motor, and wherein
   a power-conversion-circuit mounting portion on which the power conversion circuit unit covered with synthetic resin is mounted, and a power-supply-circuit mounting portion on which the power supply circuit unit mounted on a board is mounted, are formed at the end surface wall of the motor housing,
   the board of the power supply circuit unit is fixed to board fixing portions that are formed at the end surface wall of the motor housing, and
   positioning portions whose positions are fixed by the board fixing portions formed at the end surface wall of the motor housing are formed at a part of the synthetic resin covering the power conversion circuit unit.

2. The electric drive device as claimed in claim 1, wherein:
   the power-supply-circuit mounting portion formed at the end surface wall of the motor housing has a step that is away from the power-conversion-circuit mounting portion in a direction of the rotation shaft of the electric motor and forms the board fixing portions, and two board fixing portions are separately formed at a predetermined distance apart from each other at the power-conversion-circuit mounting portion, and
   positions of the positioning portions of the power conversion circuit unit are fixed by wall surfaces of the respective board fixing portions.

3. The electric drive device as claimed in claim 2, wherein:
   the power conversion circuit unit is configured by a main power conversion circuit unit, a sub-power conversion circuit unit and an abnormality response circuit unit, each of which has the positioning portions,
   the main power conversion circuit unit and the sub-power conversion circuit unit are arranged at facing positions on opposite sides of the rotation shaft of the electric motor, and the abnormality response circuit unit is arranged between the main power conversion circuit unit and the sub-power conversion circuit unit,
   positions of the positioning portions formed at the abnormality response circuit unit are fixed by the two board fixing portions formed at the power-conversion-circuit mounting portion, and
   positions of the positioning portions formed at the main power conversion circuit unit and the sub-power conversion circuit unit are fixed by the two board fixing portions formed at the power-conversion-circuit mounting portion and the board fixing portions formed by the step of the power-supply-circuit mounting portion.

4. The electric drive device as claimed in claim 3, wherein:
   the board fixing portions formed by the step of the power-supply-circuit mounting portion are formed by a protruding portion that is formed at the power-supply-circuit mounting portion so as to extend toward the rotation shaft of the electric motor.

5. The electric drive device as claimed in claim 1, wherein:
   a positioning terminal that is formed, through a board, integrally with a bus bar that is connected to an output terminal of the power conversion circuit unit is molded to the positioning portion of the power conversion circuit unit with the synthetic resin.

6. An electric power steering device comprising:
an electric motor providing a steering assistive force to a steering shaft on the basis of an output from a torque sensor that detects a turning direction and a turning torque of the steering shaft;
an motor housing accommodating therein the electric motor; and
an electronic control unit provided at an end surface wall side of the motor housing which is an opposite side to an output shaft portion of a rotation shaft of the electric motor and having a control circuit unit, a power supply circuit unit and a power conversion circuit unit that are configured to drive the electric motor, and wherein
a power-conversion-circuit mounting portion on which the power conversion circuit unit covered with synthetic resin is mounted, and a power-supply-circuit mounting portion on which the power supply circuit unit mounted on a board is mounted, are formed at the end surface wall of the motor housing,
the board of the power supply circuit unit is fixed to board fixing portions that are formed at the end surface wall of the motor housing, and
positioning portions whose positions are fixed by the board fixing portions formed at the end surface wall of the motor housing are formed at a part of the synthetic resin covering the power conversion circuit unit.

7. The electric power steering device as claimed in claim 6, wherein:
the power-supply-circuit mounting portion formed at the end surface wall of the motor housing has a step that is away from the power-conversion-circuit mounting portion in a direction of the rotation shaft of the electric motor and forms the board fixing portions, and two board fixing portions are separately formed at a predetermined distance apart from each other at the power-conversion-circuit mounting portion, and
positions of the positioning portions of the power conversion circuit unit are fixed by wall surfaces of the respective board fixing portions.

8. The electric power steering device as claimed in claim 7, wherein:
the power conversion circuit unit is configured by a main power conversion circuit unit, a sub-power conversion circuit unit and an abnormality response circuit unit, each of which has the positioning portions,
the main power conversion circuit unit and the sub-power conversion circuit unit are arranged at facing positions on opposite sides of the rotation shaft of the electric motor, and the abnormality response circuit unit is arranged between the main power conversion circuit unit and the sub-power conversion circuit unit,
positions of the positioning portions formed at the abnormality response circuit unit are fixed by the two board fixing portions formed at the power-conversion-circuit mounting portion, and
positions of the positioning portions formed at the main power conversion circuit unit and the sub-power conversion circuit unit are fixed by the two board fixing portions formed at the power-conversion-circuit mounting portion and the board fixing portions formed by the step of the power-supply-circuit mounting portion.

9. The electric power steering device as claimed in claim 8, wherein:
the board fixing portions formed by the step of the power-supply-circuit mounting portion are formed by a protruding portion that is formed at the power-supply-circuit mounting portion so as to extend toward the rotation shaft of the electric motor.

10. The electric power steering device as claimed in claim 6, wherein:
a positioning terminal that is formed, through a board, integrally with a bus bar that is connected to an output terminal of the power conversion circuit unit is molded to the positioning portion of the power conversion circuit unit with the synthetic resin.

* * * * *